US011221938B2

(12) United States Patent
Gao et al.

(10) Patent No.: US 11,221,938 B2
(45) Date of Patent: Jan. 11, 2022

(54) REAL-TIME COLLABORATION DYNAMIC LOGGING LEVEL CONTROL

(71) Applicant: INTERNATIONAL BUSINESS MACHINES CORPORATION, Armonk, NY (US)

(72) Inventors: Jin Sheng Gao, Beijing (CN); Qi Li, Beijing (CN); Bo Tong Liu, Beijing (CN); Zhi Li, Beijing (CN); Jonathan Dunne, Dungarvan (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 500 days.

(21) Appl. No.: 16/217,911

(22) Filed: Dec. 12, 2018

(65) Prior Publication Data

US 2020/0192778 A1    Jun. 18, 2020

(51) Int. Cl.
  *G06F 15/173*  (2006.01)
  *G06F 11/34*   (2006.01)
  *G06F 11/30*   (2006.01)
  *H04L 12/24*   (2006.01)
  *G06N 3/08*    (2006.01)

(52) U.S. Cl.
  CPC ........ *G06F 11/3476* (2013.01); *G06F 11/302* (2013.01); *G06F 11/3438* (2013.01); *G06N 3/08* (2013.01); *H04L 41/16* (2013.01)

(58) Field of Classification Search
  CPC .. H04L 41/16; G06F 11/3476; G06F 11/3438; G06F 11/302; G06N 3/08
  See application file for complete search history.

(56) References Cited

U.S. PATENT DOCUMENTS

| 7,398,429 | B2  |   | 7/2008 | Shaffer et al. |
| 8,190,138 | B2  | * | 5/2012 | Urakawa ................ H04L 51/12 455/418 |
| 9,342,438 | B2  |   | 5/2016 | Han |
| 2009/0241096 | A1 |  | 9/2009 | Borghetti et al. |
| 2011/0067008 | A1 |  | 3/2011 | Srivastava et al. |
| 2015/0100835 | A1 |  | 4/2015 | Suzuki |
| 2015/0143182 | A1 | * | 5/2015 | Rajamanickam ... G06F 11/3072 714/48 |
| 2017/0168914 | A1 | * | 6/2017 | Altman ............... G06F 11/3476 |
| 2017/0168915 | A1 |  | 6/2017 | Doi et al. |
| 2018/0075513 | A1 | * | 3/2018 | Bastide ............. G06Q 30/0631 |
| 2019/0166211 | A1 | * | 5/2019 | Price .................. G06F 16/2358 |

\* cited by examiner

*Primary Examiner* — Oleg Survillo

(74) *Attorney, Agent, or Firm* — Cuenot, Forsythe & Kim, LLC

(57) ABSTRACT

User activity pertaining to a product is automatically analyzed. Based, at least in part, on the analyzing the user activity pertaining to the product, a temporal logging level model can be derived. The temporal logging level model can determine a first logging level to be applied to the product. The temporal logging level model also can determine a duration of time for which the first logging level is to be applied to the product. Application of the first logging level to the product for the determined duration of time can be initiated.

18 Claims, 10 Drawing Sheets

| Current Logging Level | Keyword | Inter-Arrival Time (ms) | Log Likelihood |
|---|---|---|---|
| Warn | Slow | 0.26 | 0.867 |
| Basic | Performance | 0.98 | 0.499 |
| Basic | Buggy | 1.42 | 0.732 |
| Basic | Debug | 7.33 | 0.942 |
| Fatal | Tardy | 18.94 | 0.662 |
| Debugging | Slowest | 4.70 | 0.714 |
| Fatal | Slowest | 0.98 | 0.592 |

REAL-TIME COLLABORATION DYNAMIC LOGGING LEVEL CONTROL

BACKGROUND

The present invention relates to data processing systems, and more specifically, to logging of product events.

A log file is a file in which events that occur in a product, such as an application, hardware, etc., are recorded. Each log entry typically includes a time stamp, contextual information, and a message pertaining to an event. The act of generating log entries utilizes system resources. Accordingly, logging levels sometimes are set to specify the types of log entries that are created. For example, when a "basic" logging level is set, error messages may be logged. If a "warn" logging level is set, not only are error messages logged, but potentially harmful situations of interest also may be logged. A "fatal" logging level may be used to also log severe error events that presumably will lead an application to abort. "Debugging" logging levels provide relatively detailed tracing log files used to debug products. In comparison to the other types of logging levels, "debugging" logging levels typically utilize significantly higher levels of system resources.

SUMMARY

A method includes automatically analyzing user activity pertaining to a product. The method also can include, based, at least in part, on the analyzing the user activity pertaining to the product, deriving, using a processor, a temporal logging level model, the temporal logging level model determining a first logging level to be applied to the product and the temporal logging level model determining a duration of time for which the first logging level is to be applied to the product. The method also can include automatically initiating the first logging level to be applied to the product for the determined duration of time.

A system includes a processor programmed to initiate executable operations. The executable operations include automatically analyzing user activity pertaining to a product. The executable operations also can include, based, at least in part, on the analyzing the user activity pertaining to the product, deriving a temporal logging level model, the temporal logging level model determining a first logging level to be applied to the product and the temporal logging level model determining a duration of time for which the first logging level is to be applied to the product. The executable operations also can include automatically initiating the first logging level to be applied to the product for the determined duration of time.

A computer program product includes a computer readable storage medium having program code stored thereon. The program code is executable by a data processing system to initiate operations. The operations include automatically analyzing user activity pertaining to a product. The operations also can include, based, at least in part, on the analyzing the user activity pertaining to the product, deriving a temporal logging level model, the temporal logging level model determining a first logging level to be applied to the product and the temporal logging level model determining a duration of time for which the first logging level is to be applied to the product. The operations also can include automatically initiating the first logging level to be applied to the product for the determined duration of time.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
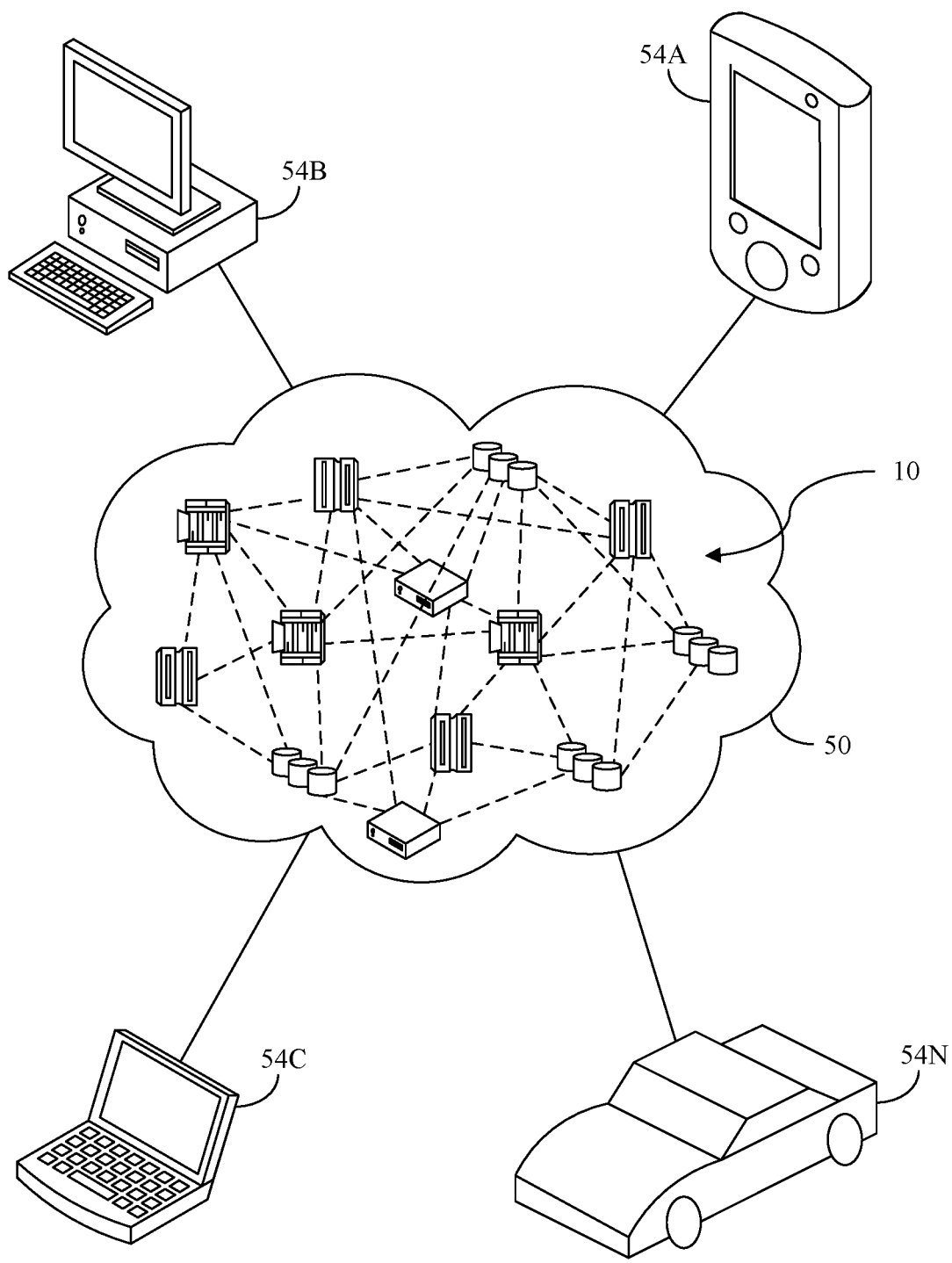
FIG. 1 depicts a cloud computing environment according to an embodiment of the present invention.

This disclosure relates to data processing systems, and more specifically, to logging of product events.

Traditionally, logging levels are manually set by a system administrator. For example, if a severe problem with a system is discovered, the logging level may be set to "debug," and will stay at that level until manually changed. When the logging level is set to "debug," the amount of system resources used to generate log entries is significantly increased, thus reducing system performance. Arrangements described herein address this issue by providing automated granular control over system logging levels, minimizing the amount of time the system is set to an elevated logging level. This serves to reduce the number of log entries the system generates, thus freeing up system resources and improving system performance.

In accordance with the arrangements described herein, an analysis can be performed on user activity within a social collaboration system to infer trigger statements. Analysis also can be performed on log data to infer a current logging level, as well as events indicating in the log data. Based on the analyses, a temporal log level (TLL) model can be derived. The TLL model can be used to determine the optimum log level and duration of the level adjustment based on real time user activity in social collaboration system. The TTL model can be implemented through the architecture of social collaboration systems that monitor currently log levels and real-time chat discourse to infer the required log levels to debug temporal issues. The TTL model can be combined with deep learning systems to provide a predictive system of pre-emptive log level adjustments.

Several definitions that apply throughout this document now will be presented.

As defined herein, the term product means hardware and/or software. Examples software that is a product include, but are not limited to, an operating system, an application, an application programming interface (API), virtualization software, drivers, etc. Examples of hardware that is a product include, but are not limited to, a data processing system, a hardware component of a data processing system, hardware to which a data processing system is communicatively linked, network infrastructure hardware, and so on.

As defined herein, the term "social collaboration system" means a system via which a plurality of people interact by exchanging electronic messages. Examples of a social collaboration system include a social networking system, a system that hosts web-based forums, a text messaging system and the like.

As defined herein, the term "log file" means a file containing log entries that are automatically generated by a data processing system.

As defined herein, the term "log entry" means a record in a log file that includes information pertaining to an event detected by a data processing system. A log entry typically includes a time stamp, contextual information and a message pertaining to an event, and may also include other data depending on the configuration of the data processing system, including hardware and software configurations.

As defined herein, the term "logging level" means a category of data logging operations that specifies the types of log entries that are to be created.

As defined herein, the term "temporal logging level" means a logging level that is intended to be applied for a specified period of time.

As defined herein, the term "electronic message" means a message electronically communicated between and/or among users, for example via text messaging, instant messaging, e-mail and/or posts to a forum.

As defined herein, the term "inter-arrival time" means an amount of time between the receipt of data that are each relevant to a same event or issue.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "automatically" means without user intervention.

As defined herein, the term "user" means a person (i.e., a human being).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
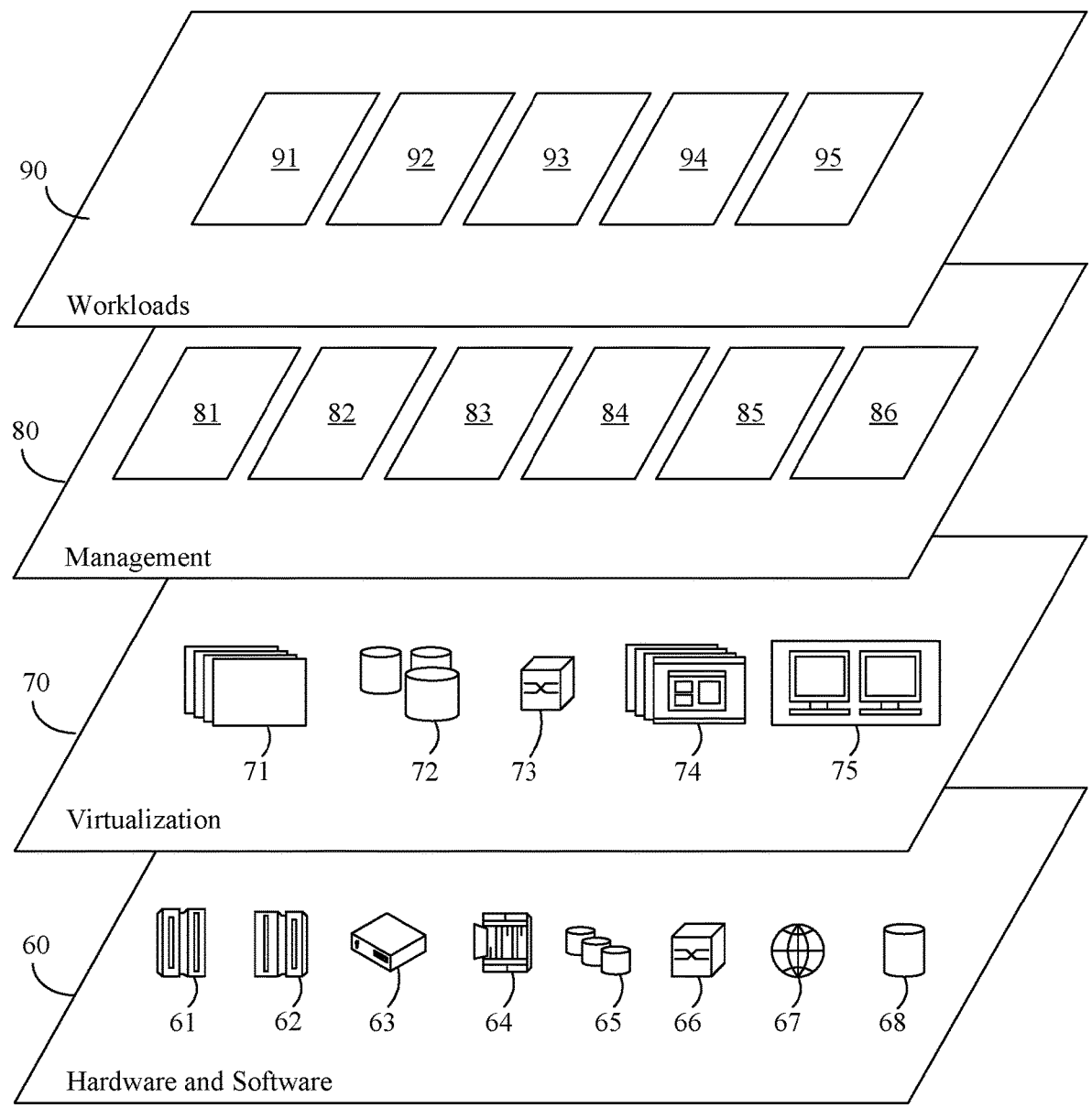
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Data logging management 86 provides dynamic adjustment of data logging levels, as will be described herein.

Figure 3:
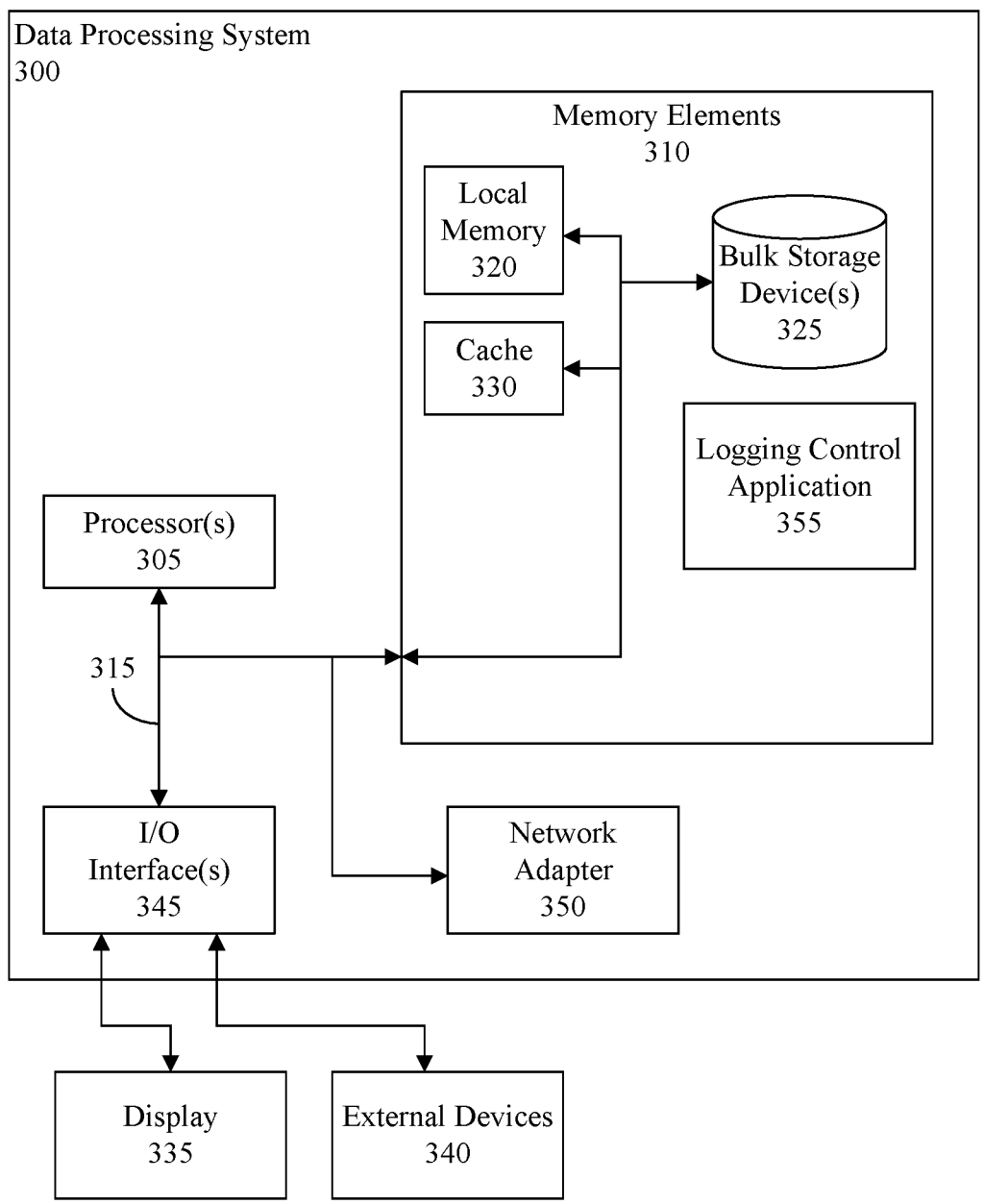
FIG. 3 is a block diagram illustrating example architecture of a data processing system.

FIG. 3 is a block diagram illustrating example hardware architecture for a data processing system 300, which can be implemented on the hardware and software layer 60 of the cloud computing environment 50. The data processing system 300 can include at least one processor 305 (e.g., a central processing unit) coupled to memory elements 310 through a system bus 315 or other suitable circuitry. As such, the data processing system 300 can store program code within the memory elements 310. The processor 305 can execute the program code accessed from the memory elements 310 via the system bus 315. It should be appreciated that the data processing system 300 can be implemented in the form of any system including a processor and memory that is capable of performing the functions and/or operations described within this specification. For example, the data processing system 300 can be implemented as a server, a plurality of communicatively linked servers, and so on. For example, the data processing system 300 can be a database server. In another arrangement, the data processing system can be a client device executing a software product receiving a log changing event, or a client device running one or more social collaboration applications.

The memory elements 310 can include one or more physical memory devices such as, for example, local memory 320 and one or more bulk storage devices 325. Local memory 320 refers to random access memory (RAM) or other non-persistent memory device(s) generally used during actual execution of the program code. The bulk storage device(s) 325 can be implemented as a hard disk drive (HDD), solid state drive (SSD), or other persistent data storage device. The data processing system 300 also can include one or more cache memories 330 that provide temporary storage of at least some program code in order to reduce the number of times program code must be retrieved from the bulk storage device 325 during execution.

Input/output (I/O) devices such as a display 335 and, optionally, one or more other external devices 340 (e.g., a keyboard, mouse, etc.) can be coupled to the data processing system 300. The I/O devices can be coupled to the data processing system 300 either directly or through intervening I/O interfaces 345. One or more network adapters 350 also can be coupled to data processing system 300 to enable the data processing system 300 to become coupled to other systems, computer systems, remote printers, and/or remote storage devices through intervening private or public networks. Modems, cable modems, transceivers, and Ethernet cards, Ethernet modules are examples of different types of network adapters 350 that can be used with the data processing system 300.

As pictured in FIG. 3, the memory elements 310 can store the components of the data processing system 300, including a logging control application 355, which can include one or more program modules. Being implemented in the form of executable program code, logging control application 355 can be executed by the data processing system 300 and, as such, can be considered part of the data processing system 300. Moreover, the logging control application 355 is a functional data structure that imparts functionality when employed as part of the data processing system 300. The logging control application 355 can be implemented in the management layer 80 of the cloud computing environment 50 (FIG. 1), for example in data logging management 86.

Figure 4:
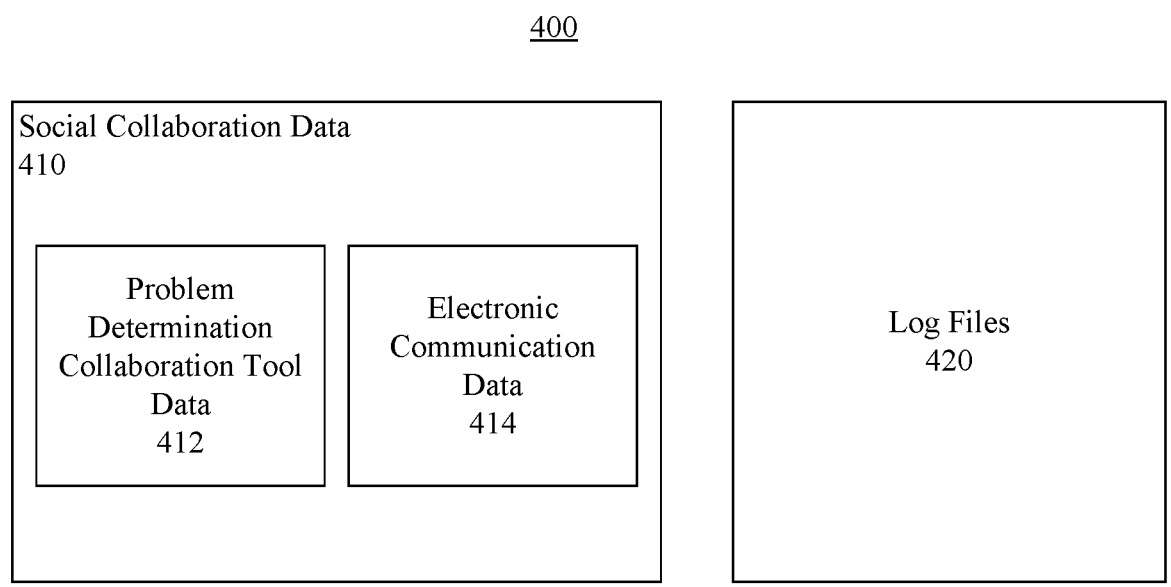
FIG. 4 depicts examples of information sources from which data can be accessed for analysis according to an embodiment of the present invention.

FIG. 4 depicts examples of information sources 400 from which data can be accessed by the logging control application 355 for analysis according to an embodiment of the present invention. The information sources can include social collaboration data 410, which can be stored in data repositories. The social collaboration data 410 can include social collaboration data, such as problem determination collaboration tool data 412 and electronic communication data 414. The problem determination collaboration tool data 412 can include data and/or electronic messages generated by users using one or more problem determination collaboration tools, which are known in the art. The electronic communication data 414 can include electronic messages communicated by users to other users using electronic communication tools, for example e-mail systems, text messaging systems, instant messaging system, electronic forums, etc. By way of example, the social collaboration data 410 can be captured by applications that monitor the exchange of electronic messages and store the electronic messages to the data repositories.

The information sources 400 can include one or more log files 420. The log files 420 can include log files generated by or for one or more products. Each log file 420 can include one or more log entries. The scope of the log entries can depend, in part, on the logging level that was applied when the log entries were generated.

Figure 5:
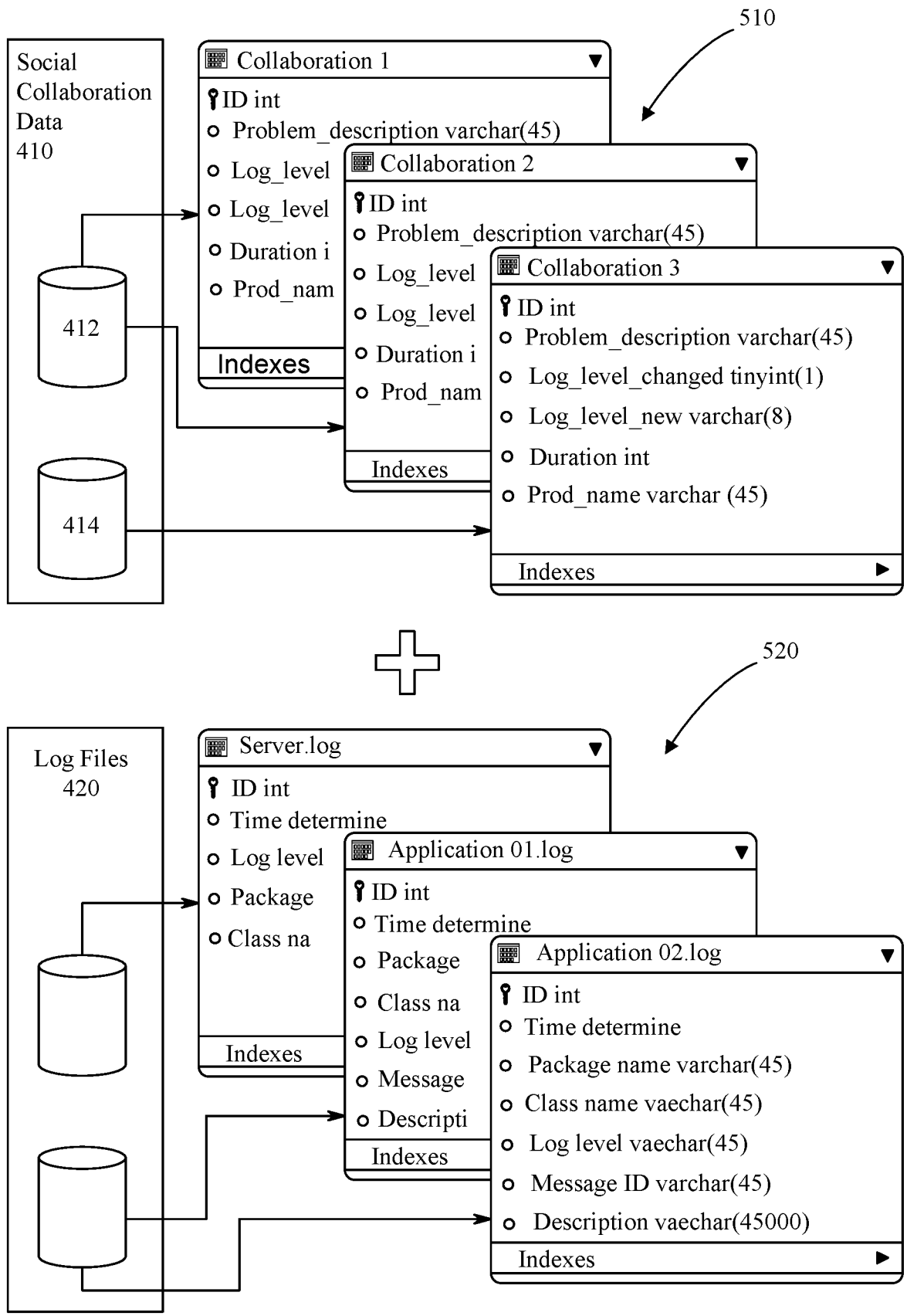
FIG. 5 illustrates examples of data prepared for analysis according to an embodiment of the present invention.

FIG. 5 illustrates examples of data 510, 520 prepared for analysis by the logging control application 355 according to an embodiment of the present invention. The logging control application 355 can monitor and filter, in real time, the social collaboration data 412, 414 to select from the social collaboration data 412, 414 data 510 determined by the logging control application 355 to be useful for dynamically determining logging levels. For instance, for each electronic message exchanged among users, the logging control application 355 can identify various types of data, for example a message identifier, a content of the message, a content type, an author identifier, a device identifier, a chat room identifier, a time stamp and topic terms. The logging control application 355 can analyze such data to determine data relevant to dynamically determining logging levels and, based on the analysis, select the data 510 from the analyzed data. The analysis can include the logging control application 355 identifying in the data 412, 414 content of messages and/or topic terms that pertain to warnings, exceptions, etc. generated for products, and identifying such terms as being relevant to dynamically determining logging levels. The logging control application 355 can store the data 510 as JavaScript Object Notation (JSON), for example.

Further, the logging control application 355 can select monitor and filter, in real time, the log files 420 to select from the log files 420 data 520 determined by the logging control application 355 to be useful for dynamically determining logging levels. For instance, each log entry can include various types of data, such as an identifier, a time stamp, a package name, a class name, an indication of a logging level used to generate the log entry, and a description. The logging control application 355 can analyze such data to determine data relevant to logging level determinations and, based on the analysis, select the data 520 from the analyzed data. The analysis can include the logging control application 355 identifying log entry identifiers, package names and descriptions that pertain to warnings, exceptions, etc. generated for products.

Moreover, the logging control application 355 can determine which data 510, 520 pertain to the same warnings, exceptions, etc. In illustration, the logging control application 355 can determine correlations between the data 510, 520 based on time stamps, content of messages and/or topic terms, identifiers, class names, package names, etc. The logging control application 355 can, for example, perform data mining, topic modeling and topic analysis in the data 510 to determine topics of the electronic messages, and correlate those topics to log entries represented in the data 520. Responsive to determining which data 510, 520 pertain to the same warnings, exceptions, etc., the logging control application 355 can create associations between such data 510, 520. For example, for a particular warning, exception, or group of warnings/exceptions, the logging control application 355 can create a record in a data table indicating the warning(s)/exception(s) and including a record identifier for each data 510, 520 that pertains to the warning(s)/exception(s).

Figures 6, 7:
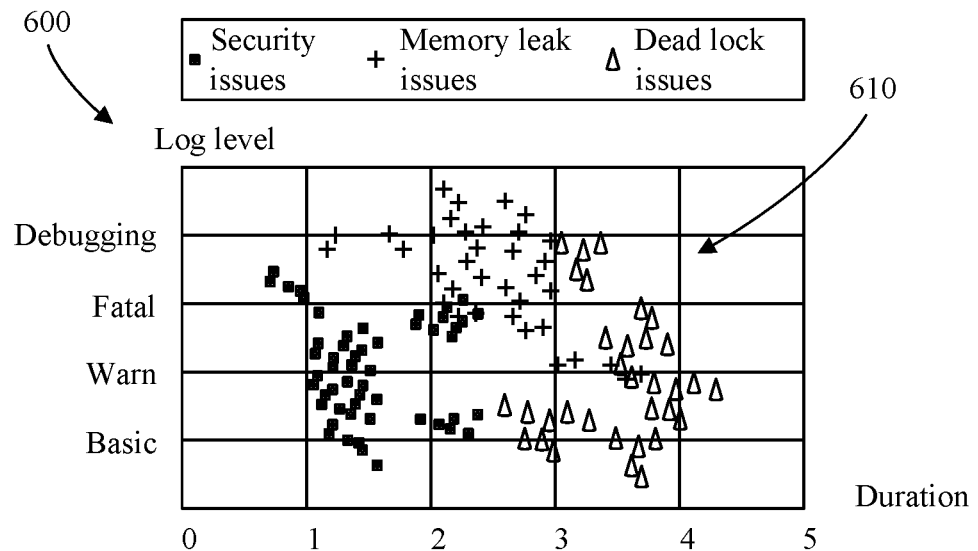
FIG. 6 depicts an example chart 600 according to an embodiment of the present invention.
FIG. 7 depicts an example of a temporal logging level (TTL) model matrix in accordance with an embodiment of the present invention.

FIG. 6 depicts an example chart 600 representing results of analyzing the data 510, 520 of FIG. 5. The chart 600 depicts data points 610, each of which represents a data 510, 520, for example an electronic message or a log entry. When analyzing the data 510, 520, the logging control application 355 can categorize each selected log entry and/or electronic message into a particular topic category, for example a topic category pertaining to security issues, a topic category pertaining to memory leak issues, a topic category pertaining to dead lock issues, and so on. Further, for each data 510, 520, the logging control application 355 can determine a data logging level that was applied when the issue occurred to which the data 510, 520 pertains, as well as a duration of time between that data 510, 520 being generated and correlating data being generated. Issues for which there are frequent electronic messages being exchanged and captured as data 510, for example with low inter-arrival times, and/or for which there are frequent log entries indicating warnings and/or exceptions being generated can be identified and the logging level for those issues can be elevated, as will be described. Based on the analysis, the logging control application 355 can derive a temporal logging level (TTL) model. The existing logging levels, topic categories and durations of time can be input vectors for the derivation of the TTL model.

FIG. 7 depicts an example of a TTL model matrix 700 that may be used to derive the TTL model. The TTL model matrix 700 can include various fields (i.e., columns) 710 and records (i.e., rows) 720 representing the data 510 (e.g., an electronic messages). Examples of the fields 710 include, but are not limited to, current logging level field 730, a keyword field 732, an inter-arrival time field 734 and log likelihood field 736. For each record 720, the logging control application 355 can identify and/or determine various parameters and/or values for the fields 730-736, and insert such parameters/values into the respective fields 730-736.

The current logging level field 730 can, for each record 720, indicate a logging level currently being implemented for a product to which an electronic message pertains. The keyword field 732 can, for each record 720, indicate a keyword, for example a topic word, identified in the electronic message. The logging control application 355 can infer the keywords in the electronic messages as trigger statements. An inter-arrival time can be an amount of time between respective electronic messages being received that are each relevant to a same event or issue, for example having the same or similar topic. In illustration, the logging control application 355 can identify terms "slow," "performance," "buggy," "debug," "tardy" and "slowest" as being similar keywords/topics/trigger statements, and determine inter-arrival time between successive electronic messages containing such terms, disregarding unrelated electronic messages from the determination of the inter-arrival times. For example, if a first electronic message pertains to a first topic, a second electronic message pertains to a second unrelated topic, and a third electronic message pertains to the first topic, the inter-arrival time for the third electronic message can be the amount of time that passed between the first electronic message being received and the third electronic message being received. It should be noted that, although not shown in FIG. 7, the logging control application 355 also can determine inter-arrival times between respective log entries (e.g., based on their respective time stamps), for example log entries that indicate the same or related events. The log likelihood field 736 can indicate a level of relevancy, for example between 0 and 1, of the keyword (e.g., an inferred trigger statement) for the record to one or more log entries contained in the data 520. In an example embodiment, the TLL model can be derived using an artificial neural network (ANN), though the present arrangements are not limited in this regard.

The TLL model can be derived for a product to which the TTL model matrix 700 pertains and receive as inputs parameters/values of the various fields 730-736 of the various records 720 as inputs. The logging control application 355 can process the inputs using the TTL model to determine whether a change from a current logging level being applied to the product is warranted. If so, using the TTL model the logging control application 355 can determine a different logging level to apply to the product and determine how long the different logging level is to be applied to the product. As will be described, the logging control application 355 can generate a TTL change request to implement the determined logging level change for the product.

Figure 8:
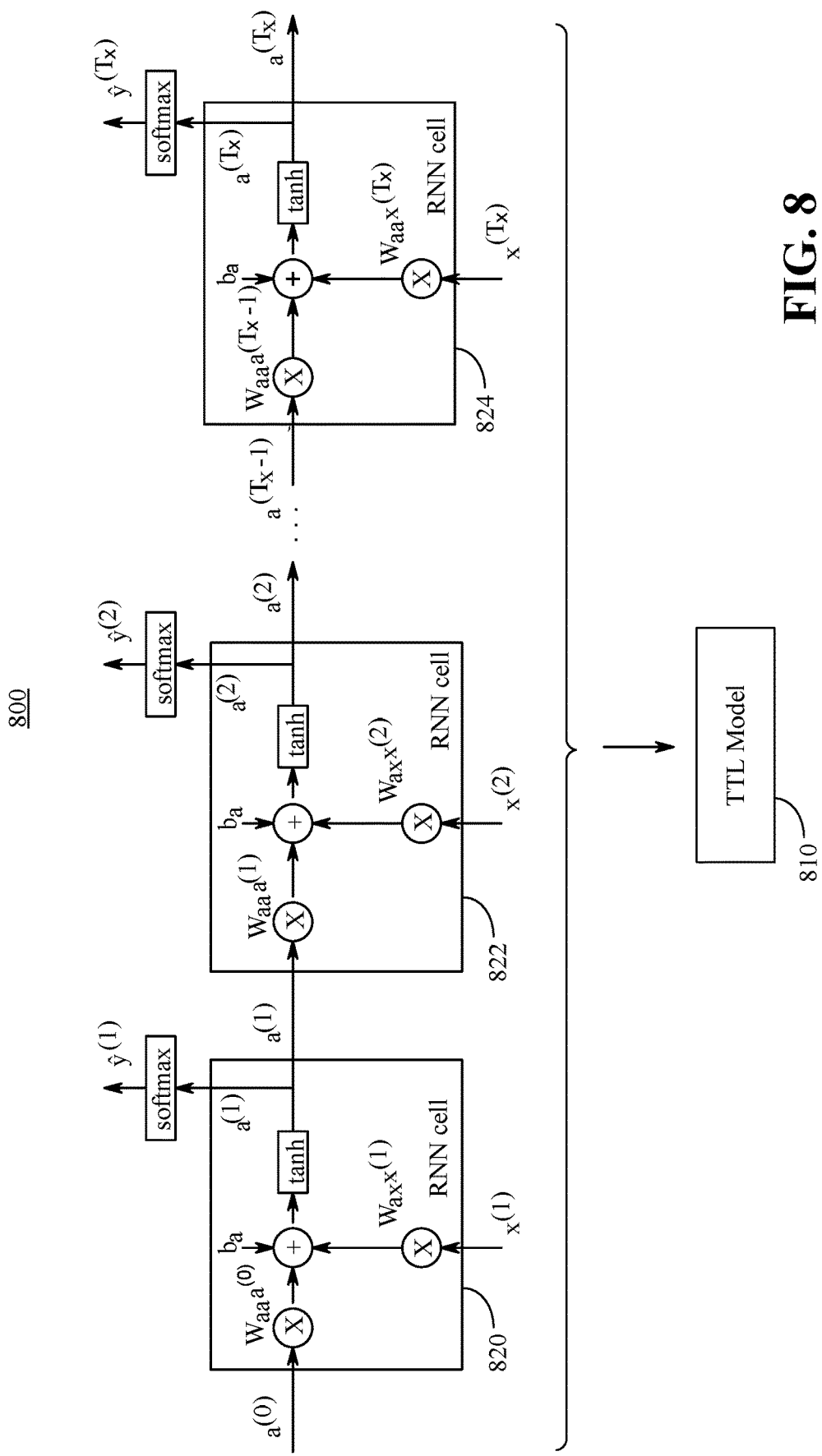
FIG. 8 depicts an example of an artificial neural network (ANN) in accordance with an embodiment of the present invention.

FIG. 8 depicts an example of an ANN 800 in accordance with an embodiment of the present invention. The logging control application 355 can implement the ANN 800 to derive the TLL model 810 using the TTL model matrix 700 (FIG. 7). FIG. 8 depicts a layer of the ANN 800. Different input vectors resulting from analyzing the prepared data 510, 520 (FIGS. 5-7) can be modeled in their own respective layers, however. For example, a first layer of the ANN 800 can be used to model current logging levels 730, a second layer of the ANN 800 can be used to model keywords (e.g., topic categories) 732, a third layer of the ANN 800 can be used to model inter-arrival times 734 of data 510, 520, a fourth layer of the ANN 800 can be used to model log likelihoods (e.g., levels of relevancy) 736, and so on. The logging control application 355 can combine the various layers to derive the TTL model 810.

In illustration, each layer of the ANN 800 can include a plurality of artificial neurons, for example recurrent neural network (RNN) cells 820, 822, 824, which are known in the art. The RNN cell 820 can receive an argument $a^{(0)}$, for example a variable of training data, and a parameter $x^{(1)}$ indicating a size of the data. The RNN cell 820 can apply a weight $W_{aa}$ to the argument $a^{(0)}$ and apply a weight $W_{ax}$ to the parameter $x^{(1)}$. Further, the RNN cell 820 can apply a bias $b_a$ to a sum of the weighted argument $W_{aa}a^{(0)}$ and the weighted parameter $W_{ax}x^{(1)}$. Further, the RNN cell 820 can apply a hyperbolic tangent function or a sigmoid function to the biased signal and output the result as $a_{(1)}$ and communicate the result to the RNN cell 822, forming a connection between the RNN cell 820 and the RNN cell 822. In this regard, the bias $b_a$ can provide a variable connection weight between the RNN cell 820 and the RNN cell 822. The RNN cell 820 also can output the biased result to a softmax function which can output a result $\hat{y}^{(1)}$. The softmax function can be a logistic function that compresses a K-dimensional vector z of arbitrary real values to a K-dimensional vector $\sigma(z)$ of real values, for $K \geq 2$, where each entry is in the interval (0, 1), and all the entries sum to 1. The softmax function can be used as a layer of the ANN to determine relative frequency of values. The hyperbolic tangent function or sigmoid function can provide high fidelity to the results in comparison to other types of functions. The process can continue until a desired number of RNN cells 820-824 are connected, and the bias's $b_a$ can be adjusted to assign variable connection weights to the connections in order to adjust the connections as learning is applied to the ANN 800. Notably, the ANN 800 can be trained over time by modifying the weights and biases applied to the cells to fit input data with expected output data. Accordingly, the TLL models derived using the ANN 800 will improve over time.

Table 1 presents an example of pseudo code that may be used with the ANN 800 to derive TTL models. The pseudo code can be used to train and optimize the TTL model 810.

TABLE 1

```
# GRADED FUNCTION: model
def model(data, X_train, Y_train, X_test, Y_test, num_iterations = 2000, learning_rate = 0.5,
print_cost = False):
    """
    Builds the logistic regression model
    Arguments:
        data -- text corpus
        X_train -- training set represented by a numpy array of topic
        Y_train -- training labels represented by a numpy array (vector) of topic
        X_test -- test set represented by a numpy array of topic
        Y_test -- test labels represented by a numpy array (vector) of topic
        num_iterations -- hyperparameter representing the number of iterations to optimize the
parameters
        learning_rate -- hyperparameter representing the learning rate used in the update rule of
optimize( )
        print_cost -- Set to true to print the cost every 100 iterations
    Returns:
        d -- dictionary containing information about the model.
    """
    ### START CODE HERE ###
        # initialize parameters with zeros
    w, b = initialize_with_zeros(X_train.topic[0])
    # Gradient descent
    parameters, grads, costs = optimize(w, b, data, X_train, Y_train, num_iterations,
learning_rate, print_cost = False)
    # Retrieve parameters w and b from dictionary "parameters"
    w = parameters["w"]
    b = parameters["b"]
    # Predict test/train set examples
    Y_prediction_test = predict(w, b, data, X_test)
    Y_prediction_train = predict(w, b, data, X_train)
    ### END CODE HERE ###
# Print train/test Errors
    print("train accuracy: { } %".format(100 – np.mean(np.abs(Y_prediction_train –
Y_train)) * 100))
    print("test accuracy: {} %".format(100 – np.mean(np.abs(Y_prediction_test –
Y_test)) * 100))
    d = {"costs": costs,
        "Y_prediction_test": Y_ predictiontest,
        "Y_prediction_train" : Y_prediction_train,
        "w" : w,
        "b" : b,
        "learning_rate" : learning_rate,
        "num_iterations": num_iterations}
    return d
```

Figure 9:
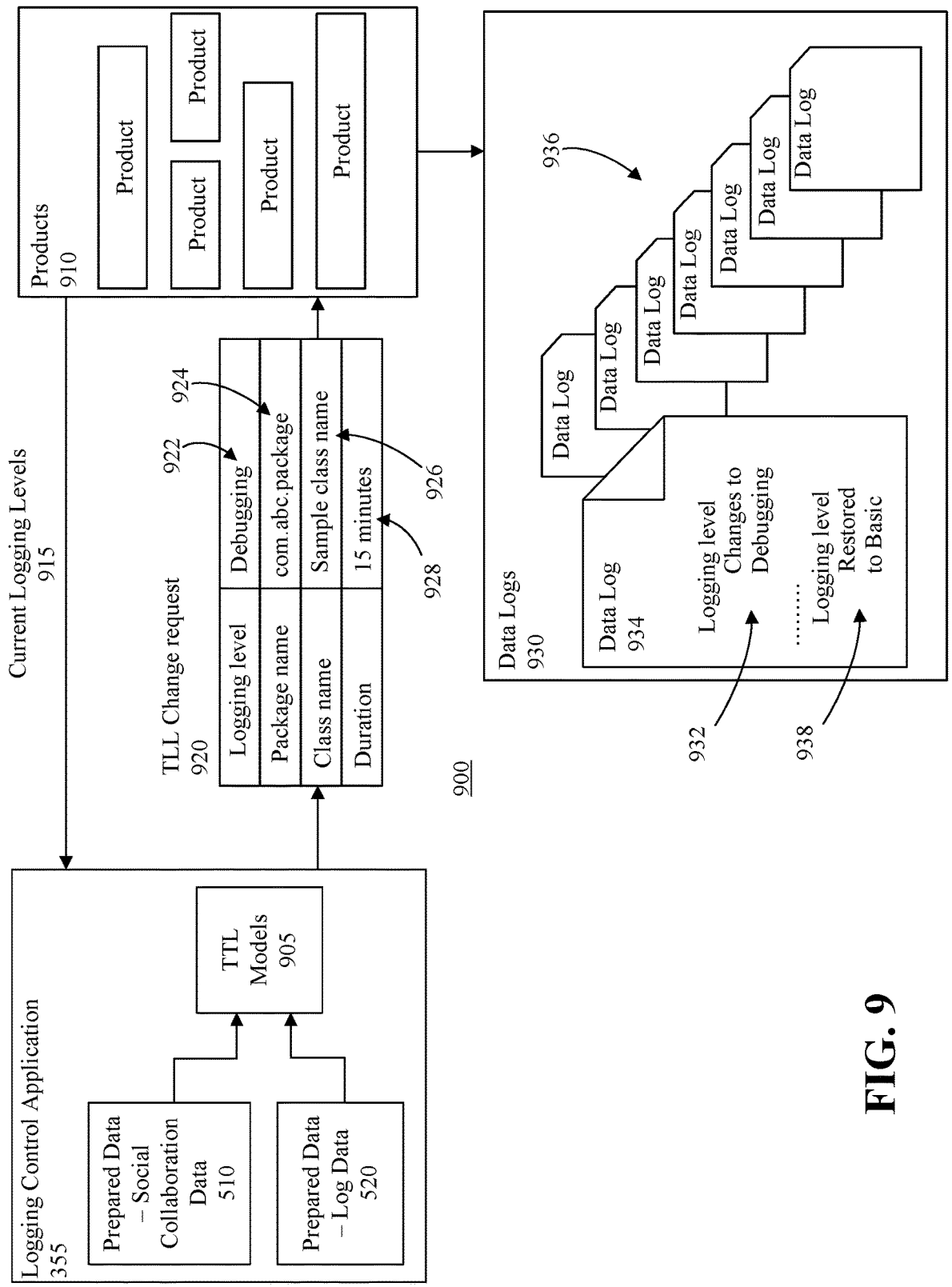
FIG. 9 depicts example software architecture using a TTL model to dynamically control one or more logging levels.

FIG. 9 depicts example software architecture 900 using TTL models 905 to dynamically control one or more logging levels. The logging control application 355 can receive from each of a plurality of products 910 a respective logging level 915 currently being used to generate log entries for the product 910. A product 910 can be, for example, a server, a client device, network infrastructure, or a component of a server, a client device or network infrastructure. Moreover, a product 910 can be software executing on a server, a client device, or network infrastructure, for example a database application, a server application, a client application, an operating system, a hypervisor, etc.

For each product 910, the logging control application 355 can monitor the prepared social collaboration data 510 and the prepared log data 520 (FIG. 5) to identify events deemed by the logging control application 355 to be significant, for example product errors, product slowdowns, anomalous product operations, etc. The events deemed to be significant can be triggers inferred from the prepared social collaboration data 510 and/or can be identified as events in the prepared log data 520, for example warnings, exceptions, errors, etc. In this regard, the logging control application 355 can maintain a listing of types of events that are deemed to be significant.

Responsive to identifying in the prepared data 510, 520 a significant event for a product, the logging control application 355 can derive a TTL model 905 for that product, for example using the ANN 800, based on a TTL model matrix 700 (FIG. 7) generated for the product 910. The TTL model 905 can generate an output indicating a recommended logging level for the product 910 and a duration of time that the recommended logging level should be implemented. If the TTL model 905 indicates a recommended logging level that is different than the current logging level 915 being used for the product 910, the logging control application 355 can generate a TTL change request 920 and communicate the TTL change request 920 to the product 910 and/or another product responsible for generating log entries for the product 910. The TTL change request 920 can indicate, for example, the recommended logging level 922, a package name 924 for the product 910, a class name 926 for the product 910 and the recommend duration of time 928 for which the recommended logging level is to be implemented.

Responsive to receiving the TTL change request 920, the product 910 and/or another product responsible for generating log entries for the product 910 can change the logging level for the product 910 for the specified duration of time 928. For example, the logging level can be changed for the identified package 924 and class 926. In the data logs 930 for the product 910, the product 910 and/or another product responsible for generating log entries for the product 910 can create a log entry 932 in at least one of the data logs, for example a log 934, indicating the logging level change. Further, the product 910 and/or another product responsible for generating log entries for the product 910 can create log entries for the product 910 in one or more other data logs 936 in accordance with the indicated logging level 922. Responsive to the duration of time expiring, the product 910 and/or another product responsible for generating log entries for the product 910 can change the logging level back to the previous logging level, create a corresponding log entry 938, and create log entries in the other data logs 936 in accordance with that logging level.

Table 2 presents an example of pseudo code that may be used to dynamically control logging levels. The pseudo code can be used to predict logging level changes to be implemented and predict amounts of time new logging levels should be applied for a product.

TABLE 2

```
# GRADED FUNCTION: predict
def predict(w, b, X):
    '''
    Predict whether the logging level need change (1) or not (0) using learned logistic
regression parameters (w, b)
    Arguments:
    w -- weights, a numpy array of size
    b -- bias, a scalar
    X -- data of size
    Returns:
    Y_prediction -- a numpy array (vector) containing all predictions (0/1) for the
examples in X
    '''
    m = X.topic[1]
    Y_prediction = np.zeros((1,m))
    w = w.ratetopic(X.topic[0], 1)
    # Compute vector "A" predicting the logging level change
    ### START CODE HERE ###
    A = sigmoid(np.topic(w.T,X)+b)
    ### END CODE HERE ###
    for i in range(A.topic[1]):
        # Convert probabilities A[0,i] to actual predictions p[0,i]
        ### START CODE HERE ###
        if A[0,i]<= 0.5:
            Y_prediction[0,i]=0
        else:
            Y_prediction[0,i]=1
        ### END CODE HERE ###
    assert(Y_prediction.topic == (1, m))
    return Y_prediction
In [ ]:
        currentLogLevel = lookupLogLevel(productName);
        optimumLogLevel = logEvent.getLogLevel( );
        if currentLogLevel < optimumLogLevel :
        deamon.changeLogLevel(productName, logEvent.getLogLevel( ));
        else :
        #Determine if a given duration is passed
            if deamon.durationPassed(productName, logEvent.getDuration( )):
            deamon. restoreLogLevel(productName)
```

Further, the TTL models 905 can be implemented through the architecture of social collaboration systems that monitor current logging levels and real-time chat discourse (i.e., electronic messages exchanged among two or more users) to infer logging levels pertinent to debugging temporal issues with products 910. With the TTL models 905 implemented in the architecture of social collaboration systems, the real-time chat discourse can be monitored and used to do the TLL predictions as input parameters to pre-control logging levels before incidents actually occur.

Table 3 presents an example of pseudo code that may be used to implement TLL prediction as an input parameter to a TTL model 905.

TABLE 3

```
In [ ]:
    if matchesChangeLogKeyword(message_space):
    #Look up product Name from a given message
    productName = lookupProductFromMessage(message_space)
    #Construct data input for model
    X = constructModel(message_space, productName);
    #Predict optimum logging level and durations
    logEvent = model.predict(w, b, X)
    return logEvent;
```

Figure 10:
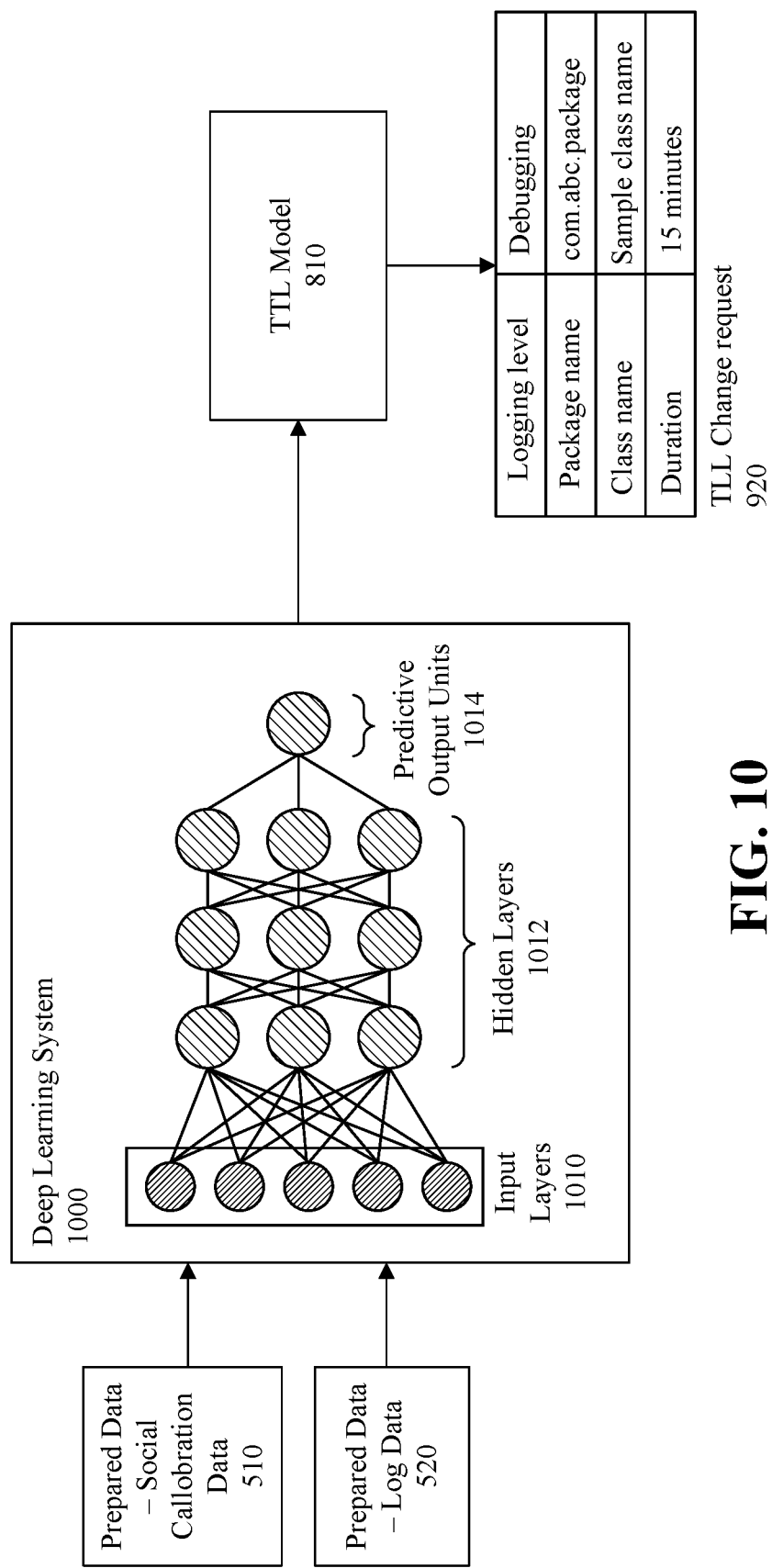
FIG. 10 depicts example software architecture using a deep learning system to dynamically control one or more logging levels.

FIG. 10 depicts example software architecture using a deep learning system 1000 to dynamically control one or more logging levels. The deep learning system 1000 can be used to train the TTL model 810 and dynamically control the logging levels in a predictive way. An example of a deep learning system 1000 is IBM Watson® provided by International Business Machines Corporation of Armonk, N.Y.

The deep learning system 1000 can include input layers 1010, hidden layers 1012 and predictive output units 1014. The logging control application 355 (not shown in FIG. 10) can input the prepared social collaboration data 510 and the prepared log data 520 to the input layers 1010 of the deep learning system 1000. The hidden layers 1012 can process the data 510, 520 to predict temporal issues with products. In response, the predictive output units 1014 can determine logging levels that should be applied to the products to pre-control logging levels before incidents actually occur. The predictive output units 1014 can output to a TTL model 810 data corresponding to such determinations. Responsive to processing the data, the TTL model 810 can generate a TTL change request 920 can communicate the TTL change request 920 to the application and/or another product responsible for generating log entries for the product. Accordingly, the logging level applied to the application can be increased to a higher level to capture events related to the incidents that are predicted to occur by the deep learning system.

Figure 11:
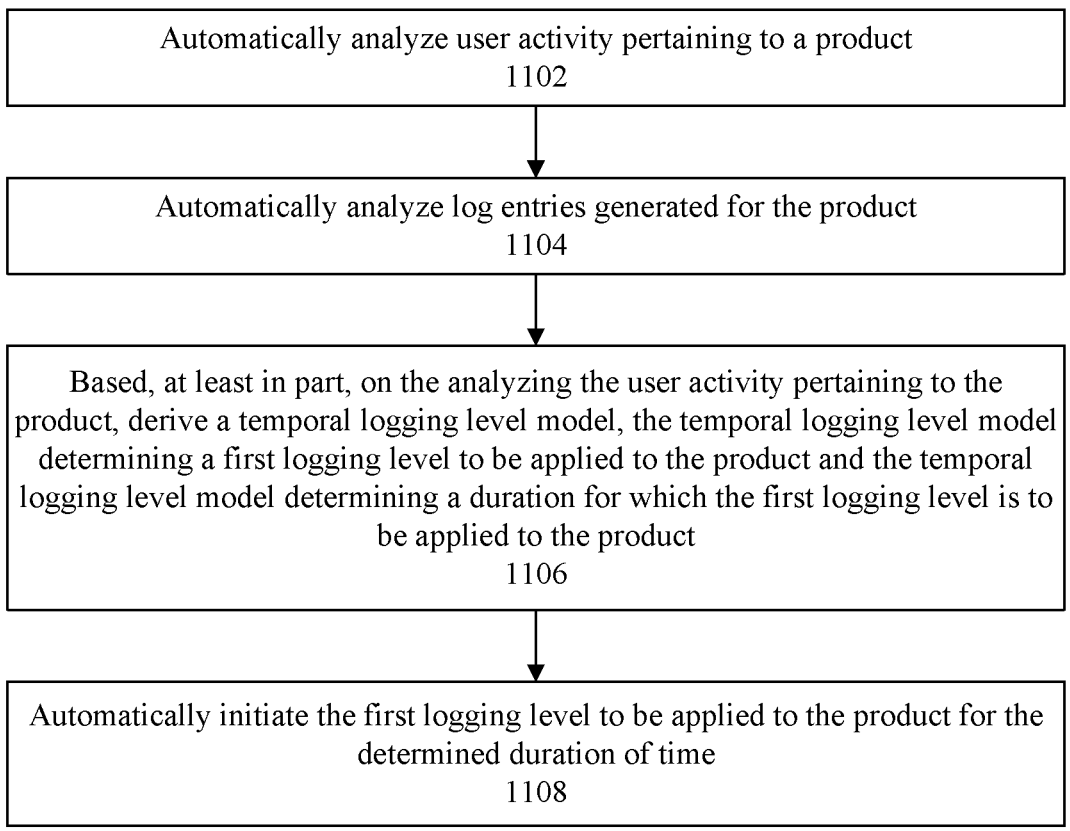
FIG. 11 is a flowchart illustrating an example of a method of dynamically controlling a logging level for a product.

FIG. 11 is a flowchart illustrating an example of a method 1100 of dynamically controlling a logging level for a product. The method 1100 can be implemented by the logging control application 355.

At step 1102, the logging control application 355 can automatically analyze user activity pertaining to a product. In illustration, the logging control application 355 can monitor and filter, in real time, social collaboration data to select data identified by the logging control application 355 as being relevant to dynamically determining logging levels. The selected data can be, for example, electronic messages exchanged between users which contain terms (e.g., keywords or topics) that the logging control application 355 infers as trigger statements. Further, analyzing the user activity pertaining to a product can include determining a relevancy of the trigger statements to at least one log entry. For example, the logging control application 355 can assign a data relevancy value to each trigger statement. As part of the analysis, the logging control application also can determine inter-arrival times between the electronic messages selected from the social collaboration data. The inter-arrival times can be determined, for example, by time stamps of the respective electronic messages.

At step 1104, the logging control application 355 can automatically analyze log entries generated for the product. In illustration, the logging control application 355 can monitor and filter, in real time, log entries to select log entries identified by the logging control application 355 as being relevant to dynamically determining logging levels. The logging control application 355 can determine inter-arrival times between the selected log entries.

At step 1106, the logging control application 355 can, based, at least in part, on the analyzing the user activity pertaining to the product, derive a temporal logging level (TLL) model. Deriving the temporal logging level model also can be based, at least in part, on the analysis performed on the log entries. The temporal logging level model can determine a first logging level to be applied to the product and determine a duration for which the first logging level is to be applied to the product. In illustration, the logging control application 355 can create a neural network. The neural network can comprise artificial neurons and connections between the artificial neurons. The connections between the artificial neurons can be assigned variable connection weights that adjust as learning is applied to the neural network. The logging control application 355 can derive the temporal logging level model from the neural network.

At step 1108, the logging control application 355 can automatically initiate the first logging level to be applied to the product for the determined duration of time. For example, the logging control application 355 can communicate a temporal logging level change request to the product or to another product and/or another product responsible for generating log entries for the product. Responsive to the determined duration of time expiring, a second logging level can be automatically applied to the product. For example, responsive to the determined duration of time expiring, the product or to another product and/or another product responsible for generating log entries for the product can apply the logging level that was being applied immediately prior to the temporal logging level change request being received.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

automatically analyzing user activity pertaining to a product, the analyzing the user activity pertaining to the product comprising identifying keywords in electronic messages exchanged between users and inferring the keywords in the electronic messages as trigger statements;

based, at least in part, on the analyzing the user activity pertaining to the product, deriving, using a processor, a temporal logging level model, the temporal logging level model determining a first logging level to be applied to the product and the temporal logging level model determining a duration of time for which the first logging level is to be applied to the product; and automatically initiating the first logging level to be applied to the product for the determined duration of time.

2. The method of claim 1, wherein, responsive to the determined duration of time expiring, a second logging level is automatically applied to the product.

3. The method of claim 1, wherein the analyzing the user activity pertaining to the product further comprises determining inter-arrival times between the electronic messages exchanged between the users.

4. The method of claim 1, wherein the analyzing the user activity pertaining to the product further comprises determining a relevancy of the trigger statements inferred from the keywords in the electronic messages to at least one log entry.

5. The method of claim 1, further comprising:

automatically analyzing log entries generated for the product;

wherein the deriving the temporal logging level model further is based on the analyzing the log entries generated for the product.

6. The method of claim 1, wherein deriving the temporal logging level model comprises:

creating a neural network, the neural network comprising artificial neurons and connections between the artificial neurons, the connections between the artificial neurons assigned variable connection weights that adjust as learning is applied to the neural network; and deriving the temporal logging level model from the neural network using a temporal logging level model matrix representing data in the electronic messages.

7. A system, comprising:

a processor programmed to initiate executable operations comprising:

automatically analyzing user activity pertaining to a product, the analyzing the user activity pertaining to the product comprising identifying keywords in electronic messages exchanged between users and inferring the keywords in the electronic messages as trigger statements;

based, at least in part, on the analyzing the user activity pertaining to the product, deriving a temporal logging level model, the temporal logging level model determining a first logging level to be applied to the product and the temporal logging level model determining a duration of time for which the first logging level is to be applied to the product; and automatically initiating the first logging level to be applied to the product for the determined duration of time.

8. The system of claim 7, wherein, responsive to the determined duration of time expiring, a second logging level is automatically applied to the product.

9. The system of claim 7, wherein the analyzing the user activity pertaining to the product further comprises determining inter-arrival times between the electronic messages exchanged between the users.

10. The system of claim 7, wherein the analyzing the user activity pertaining to the product further comprises determining a relevancy of the trigger statements inferred from the keywords in the electronic messages to at least one log entry.

11. The system of claim 7, the executable operations further comprising:

automatically analyzing log entries generated for the product;

wherein the deriving the temporal logging level model further is based on the analyzing the log entries generated for the product.

12. The system of claim 7, wherein deriving the temporal logging level model comprises:

creating a neural network, the neural network comprising artificial neurons and connections between the artificial neurons, the connections between the artificial neurons assigned variable connection weights that adjust as learning is applied to the neural network; and deriving the temporal logging level model from the neural network using a temporal logging level model matrix representing data in the electronic messages.

13. A computer program product, comprising:

a computer readable storage medium having program code stored thereon, the program code executable by a data processing system to initiate operations including:

automatically analyzing user activity pertaining to a product, the analyzing the user activity pertaining to the product comprising identifying keywords in electronic messages exchanged between users and inferring the keywords in the electronic messages as trigger statements;

based, at least in part, on the analyzing the user activity pertaining to the product, deriving a temporal logging level model, the temporal logging level model determining a first logging level to be applied to the product and the temporal logging level model determining a duration of time for which the first logging level is to be applied to the product; and automatically initiating the first logging level to be applied to the product for the determined duration of time.

14. The computer program product of claim 13, wherein, responsive to the determined duration of time expiring, a second logging level is automatically applied to the product.

15. The computer program product of claim 13, wherein the analyzing the user activity pertaining to the product further comprises determining inter-arrival times between the electronic messages exchanged between the users.

16. The computer program product of claim 13, wherein the analyzing the user activity pertaining to the product further comprises determining a relevancy of the trigger statements inferred from the keywords in the electronic messages to at least one log entry.

17. The computer program product of claim 13, wherein the program code is executable by the data processing system to initiate operations further comprising:

automatically analyzing log entries generated for the product;
wherein the deriving the temporal logging level model further is based on the analyzing the log entries generated for the product.

18. The computer program product of claim 13, wherein deriving the temporal logging level model comprises:
creating a neural network, the neural network comprising artificial neurons and connections between the artificial neurons, the connections between the artificial neurons assigned variable connection weights that adjust as learning is applied to the neural network; and
deriving the temporal logging level model from the neural network using a temporal logging level model matrix representing data in the electronic messages.

* * * * *